United States Patent [19]

Nilssen

[11] Patent Number: 4,943,884

[45] Date of Patent: * Jul. 24, 1990

[54] SERIES-EXCITED PARALLEL-LOADED RESONANT CIRCUIT

[76] Inventor: Ole K. Nilssen, Caesar Dr., Rte. 5, Barrington, Ill. 60010

[ * ] Notice: The portion of the term of this patent subsequent to Jan. 20, 2004 has been disclaimed.

[21] Appl. No.: 693,880

[22] Filed: Jan. 23, 1985

[51] Int. Cl.$^5$ .............................................. H02H 3/12
[52] U.S. Cl. ........................................ 361/15; 361/91; 361/101; 315/DIG. 7
[58] Field of Search ........................ 361/15, 17, 54, 56, 361/91, 113; 363/56; 315/74, 75, 244, 241 R, DIG. 7

[56] References Cited

U.S. PATENT DOCUMENTS 3,593,063 7/1971 Cavil ...................................... 361/56
3,942,069 3/1976 Kaneda ................................. 315/244
4,644,228 2/1987 Nilssen ............................. 361/113 X Primary Examiner—A. D. Pellinen
Assistant Examiner—H. Williams

[57] ABSTRACT

A resonant L-C circuit is series-excited from an AC voltage source and intended to be parallel-loaded with a load that, for some reason or another, may be disconnected or otherwise inoperative. For efficiency reasons, the unloaded circuit Q-factor may be about 50 times higher than the loaded Q-factor; which implies that, if the load were to become inoperative, the power drawn by the L-C circuit from the source, and the voltage/current magnitudes developed in the L-C circuit, would be 50 times larger than when the load is operative. To prevent unnecessary power drain and/or to avoid damage to source and/or circuit components, which damage may occur even if the L-C circuit is left unloaded for but a very brief period, a circuit protector is provided.

This circuit protector comprises: (i) a Varistor to provide an absolute limit on the maximum attainable magnitudes of power, voltage and current, thereby clearly protecting the source and the L-C circuit, and (ii) means operative to protect the Varistor from overloading as well as to prevent unnecessary power drain, which means provides for an intermittently interrupted short circuit across the tank-capacitor in case current flows through the Varistor for more than a very brief period of time. With the tank-capacitor shorted, the resulting power drawn from the source will be of negligible magnitude.

13 Claims, 1 Drawing Sheet

SERIES-EXCITED PARALLEL-LOADED RESONANT CIRCUIT

RELATED APPLICATION

This application is related to co-pending application Ser. No. 06/686,447 filed Dec. 26, 1984, now U.S. Pat. No. 4,638,395.

BACKGROUND OF THE INVENTION

1. Field of Invention

The present invention relates to overload protection means for a series-excited parallel-loaded high-Q resonant L-C circuit.

1. Prior Art and General Background Considerations

Voltage-limiting non-linear resistance means, such as Varistors and Zener diodes, are commonly used to provide overload and/or overvoltage protection is situations where a high-Q resonant L-C circuit is series-excited from an AC voltage source and parallel-loaded with a load that, for one reason or another, may be or may become inoperative. However, with the load inoperative, the amount of power dissipated by the voltage-limiting means must by necessity be higher than the amount of power provided to the load when it is operative; and, when this power is relatively high—as may be the case in such applications as series-excited parallel-loaded power supplies for magnetrons and/or gas discharge lamps—the amount of power that has to be dissipated by the voltage-limiting means gets to be so large as to constitute a prohibitive proposition. Moreover, the energy waste associated with this dissipation may be considerable and should be avoided.

The following typical situation may help more specifically to illustrate the problem.

In powering a fluorescent lamp by way of a high-frequency series-resonant ballast, where the ballast constitutes a high-Q resonant L-C circuit series-excited from an AC voltage source and parallel-loaded by the fluorescent lamp, there is a serious problem associated with the situation where the fluorescent lamp for one reason or another ceases to constitute an effective load for this high-Q series-excited L-C circuit. In such a situation, which is most apt to occur toward the end of normal lamp life, the power drawn by the high-Q resonant L-C circuit from its AC voltage source is in most cases so excessively high as to cause damage to or even destruction of the L-C circuit and/or the AC voltage source. On the other hand, by connecting a voltage-limiting means, such as a Varistor, as an alternative parallel-load for the L-C circuit, damage to circuit and/or source may be prevented; however, the amount of power drawn from the source in case of an inoperative lamp will be so large as to represent an unacceptable level of energy waste—recognizing that it may often take a long time before a worn-out fluorescent lamp is replaced.

SUMMARY OF THE INVENTION

Objects of the Invention

An object of the present invention is that of providing cost-effective means for preventing overload and overvoltage problems in a situation of having a high-Q resonant L-C circuit series-excited by an AC voltage source and parallel-loaded by a load that at times may be disconnected or inoperative.

This as well as other important objects and advantages of the present invention will become apparent from the following description.

Brief Description

An L-C circuit with an unloaded Q-factor of about 50 is series-connected directly across the output of a 60 Volt/30 kHz voltage source. This L-C circuit is resonant at 30 kHz, which means that it is series-resonant at the very frequency of the high-frequency voltage source.

A load, which might be a 40 Watt/120 Volt incandescent lamp, and a voltage-limiting means are both connected in parallel with the tank-capacitor of the L-C circuit, the voltage-limiting means being operative to limit the voltage developed across the tank-capacitor to a magnitude of about 180 Volt RMS.

Without the voltage-limiting means, with an unloaded Q-factor of 50 and linear circuit operation, the magnitude of the voltage developing across the tank-capacitor would have been 3000 Volt.

Under normal operation, with the particular circuit parameters chosen, the 40 Watt lamp limits the magnitude of the voltage developing across the tank-capacitor to about 120 Volt RMS; and at that point the loaded L-C circuit draws approximately 40 Watt of power from the source. Thus, with a loaded Q-factor of about 2.0 and an unloaded Q-factor of 50, the implication is that the losses in the L-C circuit amount to about 4.0% of the total power drawn from the source under normal operating conditions.

If for some reason the lamp should fail to constitute an effective load for the L-C circuit, the magnitude of the voltage across the tank-capacitor would increase to about 180 Volt, which implies that the power drawn from the source at that point would be about 60 Watt, with substantially all of it being dissipated in the voltage-limiting means.

If there were no voltage-limiting means present, however, the power drawn by the L-C circuit from the source—assuming no breakdown—would be about 1000 Watt, with all of it being dissipated within the L-C circuit itself.

The present invention provides for means to prevent the L-C circuit from operating in its resonant mode—and thereby to prevent it from drawing excessive power—in case the lamp should fail for more than a very brief period to constitute a proper load for the L-C circuit. This effect is accomplished by way of a control circuit that comprises a transistor operative, by way of a rectifier bridge, to provide a short circuit across the tank-capacitor if the load is inoperative for as long as 10 milli-seconds.

With a short-circuited tank-capacitor, the amount of power drawn by the L-C circuit is negligibly small.

More particularly, a control means is connected with the the L-C circuit and is operative to provide for the following functions.

(a) Upon initially providing power to the L-C circuit, if the lamp (or other load) is connected and operative, the control means does nothing.

(b) However, if the load is non-connected or inoperative, current will flow through the voltage-limiting means; and this current will, within about 10 milli-seconds, cause an effective short circuit to be applied across the tank-capacitor.

(c) This short circuit will remain in place for a period of about one second, whereafter it is removed.

(d) If the load by now is connected and operative, no further action by the control means takes place.

(e) However, if the load is still non-connected or non-operative, current will again flow through the voltage-limiting means; and, as before, this current will within about 10 milli-seconds re-apply the short circuit; which will then remain in effect for about one second; etc.

(f) Thus, as long as there is no load connected, the control means tries every one second (i.e., every 1000 milli-seconds) or so to provide power to the load for a period of about 10 milli-seconds.

(g) With a duty-cycle of about 10 milli-seconds out of 1000 milli-seconds (i.e., about 1.0%), the average total power dissipation in the circuit—as caused principally by dissipation in the voltage-limiting means—will be only about 0.6 Watt.

DESCRIPTION OF THE PREFERRED EMBODIMENT

Details of Construction

Figure 1:
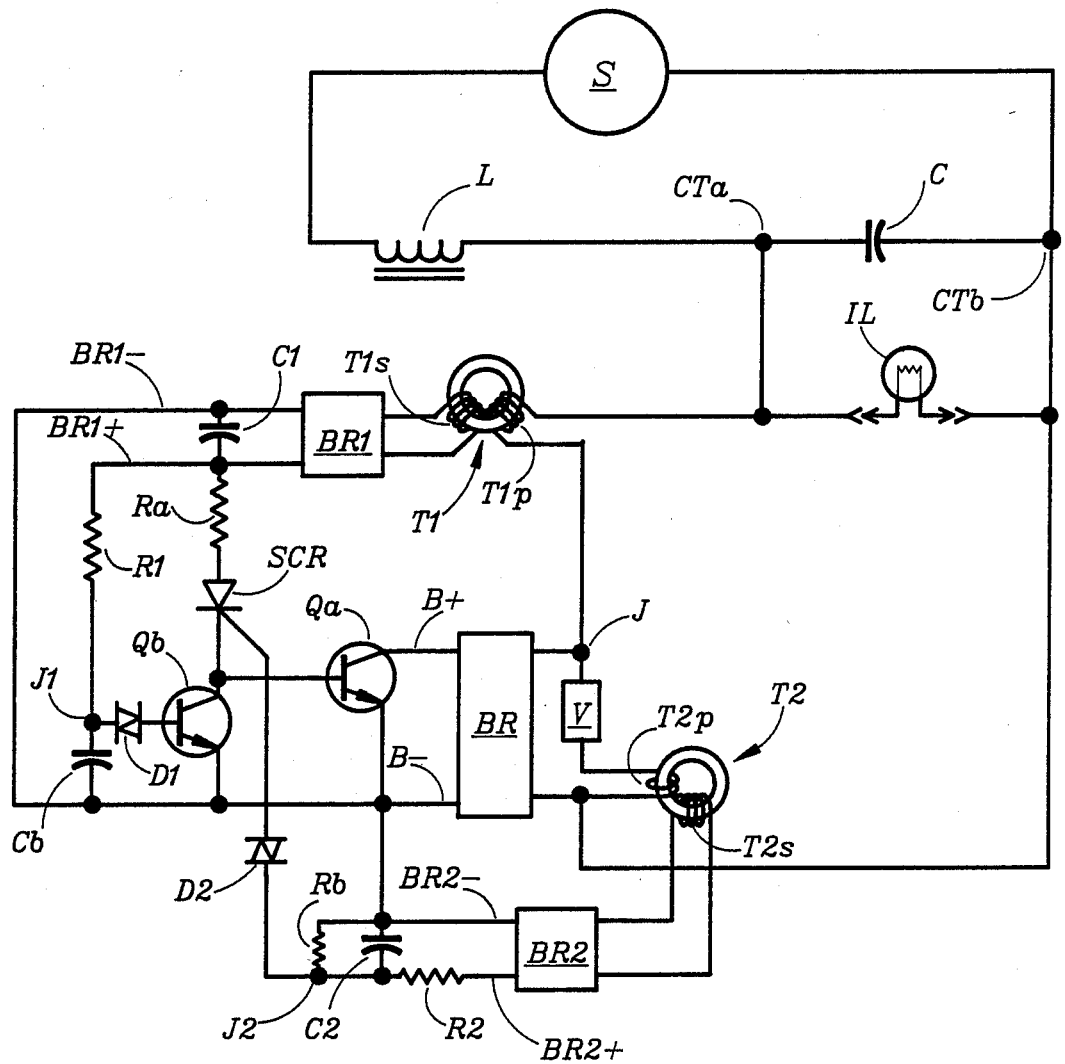
FIG. 1 provides a schematic circuit diagram of the preferred embodiment of the invention.

FIG. 1 shows an AC voltage source S, which in reality is a power-line-operated frequency converter providing an output voltage of 60 Volt RMS magnitude and 30 kHz frequency.

Connected directly across S is a series-combination of an inductor L and a capacitor C. Capacitor C has capacitor terminals CTa and CTb.

An incandescent lamp IL is connected directly between capacitor terminals CTa and CTb.

Primary winding T1p of a current transformer T1 is connected between capacitor terminal CTa and a junction J.

A Varistor V is connected in series with the primary winding T2p of a current transformer T2;, and this series-combination is connected directly between junction J and capacitor terminal CTb.

A bridge rectifier BR, having a B+ output bus terminal and a B− output bus terminal, is also connected between junction J and capacitor terminals CTb.

A transistor Qa is connected with its collector to the B+ bus and with its emitter to the B− bus.

A bridge rectifier BR1 is connected with secondary winding T1s of transformer T1; which rectifier has negative and positive output terminals BR1− and BR1+, respectively. A capacitor C1 is connected directly between output terminals BR1− and BR1+.

The negative output terminal BR1− is connected with the B− bus; the positive output terminal BR1+ is connected to one terminal of a resistor R1, the other terminal of which is connected with junction J1.

A capacitor Cb is connected between junction J1 and the B− bus. A Diac D1 is connected between junction J1 and the base of a transistor Qb. The collector and the emitter of transistor Qb are connected with the base of transistor Qa and the B− bus, respectively.

Connected between terminal BR1+ and the base of transistor Qa is a series combination of a resistor Ra and a thyristor SCR, with the anode of SCR being connected with the resistor and the cathode of SCR being connected with base of Qa.

A bridge rectifier BR2 is connected with secondary winding T2s of transformer T2; which rectifier has negative and positive output terminals BR2− and BR2+, respectively. Terminal BR2− is connected with the B− bus. A resistor R2 is connected between the BR2+ terminal and a junction J2.

A capacitor C2 and a resistor Rb are connected in parallel, and this parallel-combination is connected between junction J2 and the B− bus. A Diac D2 is connected between junction J2 and the gate of thyristor SCR.

A resistor Rp is connected across primary winding T1p of transformer T1.

Details of Operation

In FIG. 1, when the 60 Volt/3 0kHz voltage from source S is initially applied to the L-C series-circuit, a voltage is developed across capacitor C. The magnitude of this voltage rises to the point determined by the net load presented to the L-C circuit. Under normal circumstances, this net load is represented by the incandescent lamp IL. And, as long as an incandescent lamp of adequate loading capability is connected, no current will flow in the primary windings of transformers T1 and T2, which means that no further action takes place by the circuit associated with the following principal components: Varistor V; current transformers T1 and T2; bridge rectifiers BR, BR1 and BR2; transistors Qa and Qb; thyristor SCR; and Diacs D1 and D2.

However, in situations where the lamp is removed or otherwise non-functional, the magnitude of the 30 kHz voltage developing across tank-capacitor C rises to a level high enough to cause current to flow through the Varistor. The current flowing through the Varistor also flows through the primary winding of current transformer T2, which then gives rise to a DC output to charge capacitor C2 to about 30 Volt in about 10 milli-seconds. At about 30 Volt, Diac D2 breaks down and provides a pulse to trigger thyristor SCR.

The current flowing through the Varistor also flows through the parallel-combination of resistor Rp and the primary winding of transformer T1, thereby providing a DC voltage at the output of rectifier BR1. Thus, from the moment the thyristor is triggered into conduction, unidirectional current starts flowing from rectifier BR1 and into the base of transistor Qa, thereby causing transistor Qa to conduct and to provide an effective short circuit between junction J and terminal CTb. The value of resistor Ra is chosen such that the amount of current flowing into the base of Qa is just adequate to provide for an effective short circuit.

As long as transistor Qa provides for a short circuit, current will continue to flow through the primary winding of transformer T1; which means that the short circuit will remain in effect until the base current provided to Qa is interrupted.

The DC output voltage of BR1 is also used for charging capacitor Cb by way of resistor R1. After about one second, the voltage on Cb reaches a magnitude high enough for Diac D1 to break down, at which point the charge on capacitor Cb will flow into the base of transistor Qb, thereby causing Qb to conduct heavily enough to shunt away the base current of Qa. At this point, Qa is rendered non-conductive, which means that the short circuit between junction J and terminal CTb is broken.

With the short circuit removed, the voltage across tank-capacitor C will again rise until limited by the effective load presented to the L-C circuit. If the lamp is still non-connected or non-functional, the Varistor again takes over as the effective load on the L-C circuit. And, within about 10 milli-seconds, capacitor C2 again charges up to the point of causing breakdown of Diac D2. This breakdown again initiates the short circuit between junction J and terminal CTb, which short circuit will again remain in effect for about one second; whereafter the same cycle will be repeated indefinitely—until power is removed or until a functional lamp is connected.

It is believed that the present invention and its several attendant advantages and features will be understood from the preceding description. However, without departing from the spirit of the invention, changes may be made in its form and in the construction and interrelationships of its component parts, the form herein presented merely representing the presently preferred embodiment.

I claim:

1. An arrangement operable to power a load from a source of AC voltage, comprising:
   an L-C circuit operable to be series-connected across said source, said L-C circuit being resonant at or near the frequency of said AC voltage and having a tank-inductor and a tank-capacitor;
   connect means operable to connect said load in parallel-circuit with said tank-capacitor;
   voltage-limiting means connected in parallel-circuit with said tank-capacitor, said voltage-limiting means being operative to conduct current, but only when said load is inoperative to keep the magnitude of the voltage across said tank-capacitor below a certain level; and
   control means operative to substantially cause a short circuit to be applied across the tank-capacitor in case current flows through said voltage-limiting means for more than a brief period.

2. The arrangement of claim 1 and means to remove said short circuit after a short period.

3. The arrangement of claim 2 where said short period is substantially longer than said brief period.

4. The arrangement of claim 2 wherein said control means is operative to apply and/or to remove said short circuit in an abrupt manner.

5. The arrangement of claim 1 wherein said control means comprises rectifier means and transistor means operative to provide for said short circuit.

6. An arrangement comprising:
   a source of high-frequency AC voltage;
   an L-C circuit series-connected across said source, said L-C circuit having a tank-capacitor and being resonant at or near the frequency of said AC voltage;
   a load means and a voltage-limiting means, both effectively connected in parallel with said tank-capacitor; and
   shorting means operative, whenever current flows through the voltage-limiting means for more than a brief period, to substantially cause a short circuit to be placed across the tank-capacitor, thereby to prevent excessive power drain by the L-C circuit from said source in case said load means is inoperative.

7. The arrangement of claim 6 and means operative to remove said short circuit after a short period of time.

8. The arrangement of claim 7 wherein said short period is substantially longer than said brief period.

9. The arrangement of claim 6 where the frequency of said AC voltage is on the order of 30 kHz.

10. An arrangement comprising:
    a source of AC voltage;
    an L-C circuit series-connected across said source, said L-C circuit having a tank-capacitor and being resonant at of near the frequency of said AC voltage;
    load means effectively connected in parallel-circuit with said tank-capacitor; and
    protection means connected in circuit with the L-C circuit and effectively operative to establish a low-impedance path across said tank-capacitor in case said load means is inoperative for more than brief period of time to provide an adequate load for said L-C circuit.

11. The arrangement of claim 10 and means for removing said low-impedance path after a short period of time.

12. The arrangement of claim 11 wherein said short period of time is substantially longer than said brief period of time.

13. An arrangement comprising:
    a source of AC voltage;
    an L-C circuit series-connected across said source, said L-C circuit being resonant at or near the frequency of said AC voltage and having a tank-capacitor;
    a load connected in parallel-circuit with said tank-capacitor and generally operative to prevent the magnitude of the voltage developing thereacross from reaching a certain level;
    non-linear dissipative voltage-limiting means, such as a Varistor, connected in parallel-circuit with the tank-capacitor and operative, in case the load were to fail to prevent the magnitude of the voltage developing across the tank-capacitor from reaching said certain level, to prevent the magnitude of voltage developing across the tank-capacitor from exceeding said certain level; and
    protection means connected in circuit with the source, the L-C circuit and the voltage-limiting means and operative, but only in case the voltage-limiting means has indeed been inoperative to prevent the voltage across the tank-capacitor from exceeding said certain level for longer than a brief period of time, to cause the magnitude of the voltage present across the tank-capacitor to decrease to a level below said certain level;
    thereby to prevent a continuous condition of substantial energy-dissipation by the voltage-limiting means.

* * * * *